(12) United States Patent
Moulik et al.

(10) Patent No.: US 9,254,727 B2
(45) Date of Patent: Feb. 9, 2016

(54) GAS SPRING AND GAS DAMPER ASSEMBLY

(71) Applicant: Firestone Industrial Products Company, LLC, Indianapolis, IN (US)

(72) Inventors: Pradipta N. Moulik, Carmel, IN (US); Graham R. Brookes, Noblesville, IN (US); Joseph A. Bounds, Fishers, IN (US)

(73) Assignee: Firestone Industrial Products Company, LLC, Indianapolis, IN (US)

( * ) Notice: Subject to any disclaimer, the term of this patent is extended or adjusted under 35 U.S.C. 154(b) by 0 days.

(21) Appl. No.: 14/404,119

(22) PCT Filed: May 29, 2013

(86) PCT No.: PCT/US2013/043099
§ 371 (c)(1),
(2) Date: Nov. 26, 2014

(87) PCT Pub. No.: WO2013/181241
PCT Pub. Date: Dec. 5, 2013

(65) Prior Publication Data
US 2015/0130146 A1    May 14, 2015

Related U.S. Application Data (60) Provisional application No. 61/652,836, filed on May 29, 2012.

(51) Int. Cl.
*B60G 15/12* (2006.01)
*F16F 9/04* (2006.01)
*B60G 17/052* (2006.01)

(52) U.S. Cl.
CPC ............ *B60G 15/12* (2013.01); *B60G 17/0521* (2013.01); *F16F 9/049* (2013.01); *F16F 9/0472* (2013.01); *B60G 2202/152* (2013.01); *B60G 2202/242* (2013.01); *B60G 2202/32* (2013.01); *B60G 2206/41* (2013.01); *B60G 2206/424* (2013.01); *B60G 2400/252* (2013.01); *B60G 2400/51222* (2013.01)

(58) Field of Classification Search
CPC ............... B60G 15/12; B60G 17/0521; B60G 2206/41; B60G 2206/32; B60G 244/51222; B60G 2206/424; B60G 2400/252; F16F 9/0472
See application file for complete search history.

(56) References Cited

U.S. PATENT DOCUMENTS 3,212,769 A * 10/1965 Ishibashi et al. ........... 267/64.23
6,161,821 A * 12/2000 Leno et al. .................. 267/64.24
(Continued)

FOREIGN PATENT DOCUMENTS

| DE | 103 56 438 | 5/2005 |
|---|---|---|
| EP | 1 715 215 | 10/2006 |
| JP | 2006 281981 | 10/2006 |

OTHER PUBLICATIONS

International Search Report for corresponding Patent Application No. PCT/US2013/043099 dated Jul. 17, 2013.

*Primary Examiner* — Faye M Fleming
(74) *Attorney, Agent, or Firm* — Jason A. Houser; Fay Sharpe LLP (57) ABSTRACT

A gas spring and gas damper assembly (110; 200; 400) can include a gas spring assembly (128; 202; 402) and a gas damper assembly (130; 204; 404). The gas spring assembly can include opposing end members (206, 208; 406, 408) and a flexible spring member (210; 410) secured there between that at least partially forms a spring chamber (212; 412). One of the end members (208; 408) can include an end member chamber (268; 468) that is separated into a plurality of damping chambers (292, 294; 492, 494). Damper pistons (300, 302; 500, 502) are disposed within the damping chambers (292, 294; 492, 494) and are connected to the other end member (206; 406) by way of a damping rod (276; 476).

20 Claims, 6 Drawing Sheets

(56) References Cited

U.S. PATENT DOCUMENTS

| | | |
|---|---|---|
| 2003/0173723 A1 | 9/2003 | Behmenburg |
| 2004/0124571 A1 | 7/2004 | Gold |
| 2011/0115140 A1 | 5/2011 | Moulik |

* cited by examiner

GAS SPRING AND GAS DAMPER ASSEMBLY

This application is the National Stage of International Application No. PCT/US2013/043099, filed on May 29, 2013, which claims the benefit of priority from U.S. Provisional Patent Application No. 61/652,836 filed on May 29, 2012, the subject matter of which is hereby incorporated herein by reference in its entirety.

BACKGROUND

The present disclosure broadly relates to the art of spring devices and, more particularly, to a gas spring and gas damper assembly that includes a plurality of damping chambers arranged in series with one another, as well as a vehicle suspension system including one or more of such gas spring and gas damper assemblies.

Suspension systems, such as may be used in connection with apparatuses, such as motorized vehicles, for example, can include one or more spring elements for accommodating forces and loads associated with the operation and use of the corresponding apparatus (e.g., a motorized vehicle) to which the suspension system is operatively connected. In such applications, it is often considered desirable to utilize spring elements that operate at a lower relative spring rate, as such a reduced spring rate can favorably influence certain performance characteristics, such as vehicle ride quality and comfort, for example. That is, it is well understood in the art that the use of a spring element having a higher spring rate (i.e. a stiffer spring) will transmit a greater magnitude of inputs (e.g., road inputs) to the sprung mass and that, in some applications, this could undesirably affect the sprung mass, such as, for example, by resulting in a rougher, less-comfortable ride of a vehicle. Whereas, the use of spring elements having lower spring rates (i.e., a softer or more-compliant spring) will transmit a lesser amount of the inputs to the sprung mass.

Such suspension systems also commonly include one or more dampers or damping components that are operative to dissipate energy associated with undesired inputs and movements of the sprung mass, such as road inputs occurring under dynamic operation of a vehicle, for example. Typically, such dampers are liquid filled and operatively connected between a sprung and unsprung mass, such as between a body and axle of a vehicle, for example. One example of such damping components are conventional shock absorbers that are commonly used in vehicle suspension systems.

In other arrangements, however, the dampers or damping components can be of a type and kind that utilizes gas rather than liquid as the working medium. In such known constructions, the gas damper portion permits gas flow between two or more volumes of pressurized gas, such as through one or more orifices, as shown, for example, in U.S. Patent Application Publication No. 2004/0124571, or through one or more valve ports, as shown, for example, in U.S. Patent Application Publication No. 2003/0173723. Generally, there is some resistance to the movement of pressurized gas through these passages or ports, and this resistance acts to dissipate energy associated with the gas spring portion and thereby provide some measure of damping.

One factor that may be limiting the broader adoption and use of gas spring and gas damper assemblies relates to the additional volumes of pressurized gas that are utilized by some designs. Certain difficulties relating to the incorporation of such additional volumes of pressurized gas in proximal association with the corresponding gas spring and gas damper assembly. As one example, motorized vehicle commonly include significant packaging and/or space limitations that can reduce the volume that is available adjacent the gas spring and gas damper assembly for storing pressurized gas. As such, in some cases, a reduced volume of pressurized gas may be used. In other cases, the desired volume of pressurized gas may be provided in a remote location relative to the gas spring and gas damper assembly. In either case, some decrease in damping performance may result.

Accordingly, it is desired to develop a gas spring and gas damper assembly as well as a suspension system including one or more of such assemblies that overcome the foregoing and/or other difficulties associated with known constructions, and/or which may otherwise advance the art of gas spring and gas damper assemblies.

BRIEF SUMMARY

One example of a gas spring and gas damper assembly in accordance with the subject matter of the present disclosure can include a flexible spring member, a first end member and a second end member. The flexible spring member can have an longitudinal axis and can include a flexible wall extending peripherally about the axis and longitudinally between opposing first and second ends to at least partially define a spring chamber. The first end member can extend across the first end of the flexible spring member and can be secured to the flexible spring member such that a substantially fluid-tight seal is formed therebetween. The second end member can extend across the second end of the flexible spring member and can be secured to the flexible spring member such that a substantially fluid-tight seal is formed therebetween. Additionally, the second end member can include an end member wall that at least partially defines an end member chamber having a fixed volume. A damper rod can extend longitudinally between opposing first and second ends with the first end operatively connected to the first end member and the second end disposed within the end member chamber of the second end member. A partition wall can extend across the end member chamber and can be secured along the end member wall such that the end member chamber is separated into first and second damping chambers having corresponding first and second fixed volumes. A first damper piston can be disposed within the first damping chamber and can separate the first damping chamber into first and second damper portions that are disposed along opposing sides of the first damper piston. A second damper piston can be disposed within the second damping chamber and can separate the second damping chamber into first and second damper portions that are disposed along opposing sides of the second damper piston. The first and second damper pistons can be secured to the damper rod such that the first and second damper pistons can move relative to the second end member and the partition wall upon displacement of the first and second end members relative to one another.

One example of a suspension system in accordance with the subject matter of the present disclosure can include one or more gas spring and gas damper assemblies according to the foregoing paragraph, and a pressurized gas system operatively connected to the one or more gas spring and gas damper assemblies.

DETAILED DESCRIPTION

Figure 1:
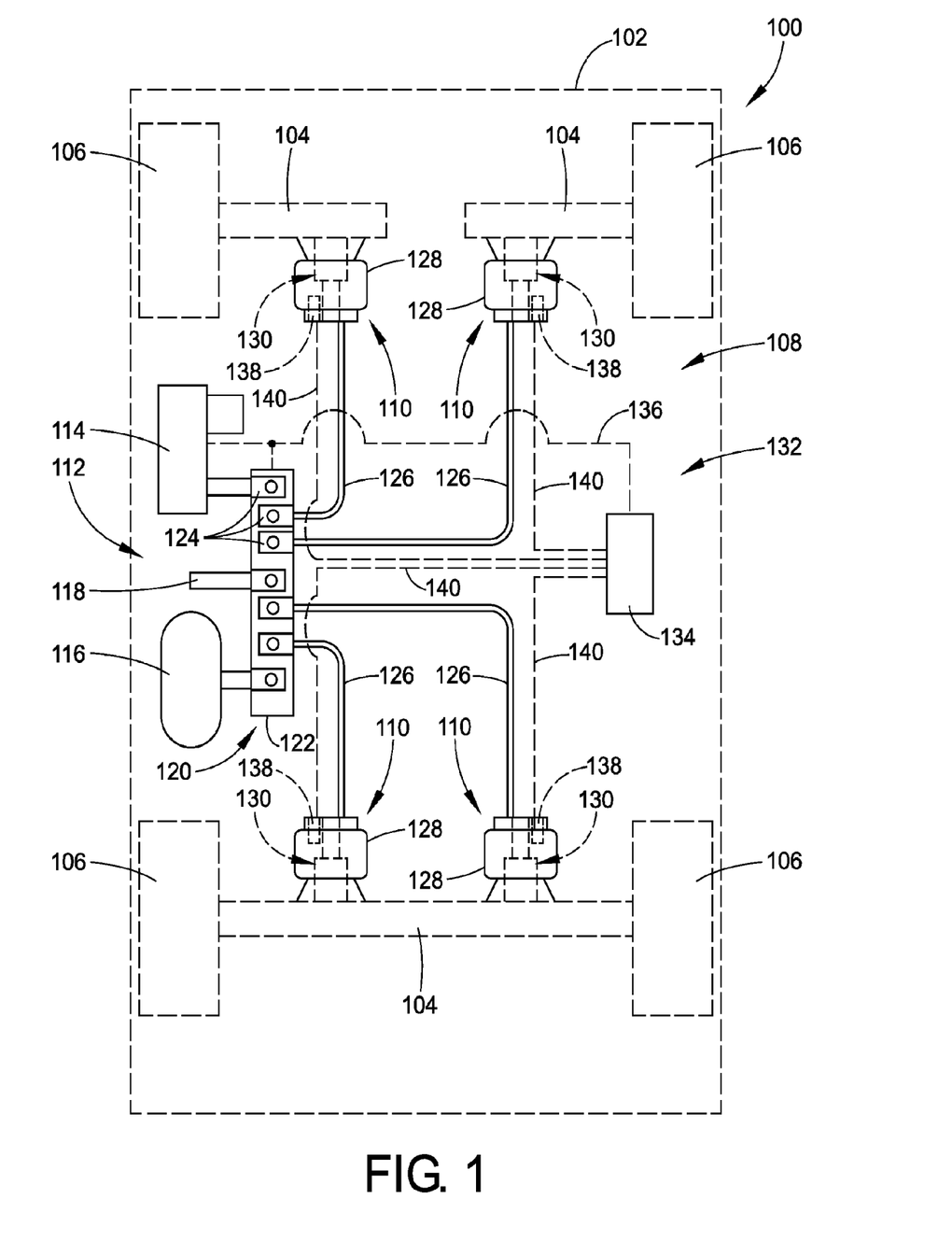
FIG. 1 is a schematic representation of one example of a vehicle including a suspension system utilizing gas spring and gas damper assemblies in accordance with the subject matter of the present disclosure.

Turning now to the drawings wherein the showings are for the purpose of illustrating exemplary embodiments of the subject matter of the present disclosure and not for limiting the same, FIG. 1 illustrates a vehicle 100 having a sprung mass, such as a vehicle body 102, for example, and an unsprung mass, such as axles 104 and/or wheels 106, for example. Additionally, vehicle 100 can include a suspension system 108 that is operatively connected between the sprung and unsprung masses. The suspension system can include a plurality of gas spring and gas damper assemblies 110 that are operatively connected between the sprung and unsprung masses of the vehicle. Assemblies 110 can be disposed between the sprung and unsprung masses in any suitable manner, configuration and/or arrangement. For example, assemblies 110 are shown in FIG. 1 as being disposed adjacent wheels 106. Depending on desired performance characteristics and/or other factors, the suspension system may, in some cases, also include damping members (not shown) of a typical construction that are provided separately from assemblies 110 and secured between the sprung and unsprung masses in a conventional manner. In a preferred arrangement, however, gas spring and gas damper assemblies 110 will be sized, configured and operative to provide the desired performance characteristics for the suspension system without the use of additional damping members (e.g., conventional struts or shock absorbers) that are separately provided.

Vehicle 100 also includes a pressurized gas system 112 that is in communication with assemblies 110 and that is operative to selectively supply pressurized gas thereto and exhaust pressurized gas therefrom. Pressurized gas system 112 can include a pressurized gas source, such as a compressor 114, and can optionally include a storage vessel, such as a reservoir 116, for example, for receiving and storing pressurized gas, such as may be generated by the pressurized gas source. System 112 can further include a suitable exhaust, such as a muffler 118, for example, for venting pressurized gas from the system.

Pressurized gas system 112 can be in communication with the gas spring and gas damper assemblies in any suitable manner. For example, system 112 can include a valve assembly 120 or other suitable control device or arrangement for selectively distributing pressurized gas to, from and/or between the pressurized gas source or sources, the exhaust and/or the gas spring and gas damper assemblies. As one example, valve assembly 120 can include a valve body 122 and a plurality of valves 124 that are selectively operable to place corresponding ports (not shown) of valve body 122 in fluid communication with one another. As shown in the exemplary embodiment in FIG. 1, compressor 114, reservoir 116 and muffler 118 are in fluid communication with valve assembly 120 and can be selectively placed in fluid communication with one another by way of the valve assembly. Additionally, assemblies 110 are in fluid communication with valve assembly 120 by way of gas transmission lines 126 and, thus, can be selectively placed in communication with the compressor, reservoir, muffler and/or one another by way of the valve assembly.

It will be appreciated that gas spring and gas damper assemblies 110 can take any suitable form, configuration and/or construction in accordance with the present novel concept. In the embodiment shown in FIG. 1, each assembly 110 includes a gas spring assembly 128 and a gas damper assembly, which is schematically represented in FIG. 1 by item number 130, that is substantially-entirely contained within gas spring assembly 128. Gas spring assemblies 128 include a spring chamber (not numbered) that is operative to receive and retain a quantity of pressurized gas. Gas damper assemblies 130 can include a plurality of components that are telescopically interconnected with one another and at least partially define a plurality of damping chambers. In some cases, one of the gas dampers can be at least partially received within the spring chamber of a gas spring assembly with one or more of the damping chambers being in fluid communication with the spring chamber of the gas spring assembly.

In operation of the exemplary embodiment shown in FIG. 1, valve assembly 120 can be selectively actuated to transfer pressurized gas from the compressor and/or reservoir to one or more of gas spring and gas damper assemblies 110 via one or more of gas transmission lines 126. Additionally, valve assembly 120 can be selectively actuated to exhaust pressurized gas from one or more of the gas spring and gas damper assemblies through the gas transmission lines, such as by way of muffler 118 or another suitable arrangement. It will be appreciated that the foregoing pressurized gas system and operation thereof are merely exemplary and that other suitable pressurized gas sources, systems and/or methods of operation could alternately be used without departing from the subject matter of the present disclosure.

Vehicle 100 also includes a control system 132 for selectively operating, adjusting or otherwise influencing or controlling the performance or one or more suspension system components, such as gas spring and gas damper assemblies 110 and/or pressurized gas system 112, for example. Control system 132 can include an electronic control unit 134 in communication with one or more components of valve assembly 120, such as through a communication line 136, for example, for selective actuation and/or operation thereof. Electronic control unit 134 is also shown in FIG. 1 as being in communication with suitable height sensing devices 138 that can optionally be used in association with gas spring and gas damper assemblies 110. It will be appreciated that such communications can be implemented in any suitable manner, such as by way of communication lines 140, for example. Additionally, it will be appreciated that height sensors or other distance-determining devices of any suitable type, kind, construction and/or configuration can be used, such as mechanical linkage sensors, ultrasonic wave sensors or electromagnetic wave sensors, for example. Additionally, devices 138 can be representative of or otherwise include one or more other sensors, sensing devices and/or other such components can also, optionally, be used in connection with suspension control system 132, such as pressure sensors, accelerometers and/or temperature sensors, for example.

Figure 2:
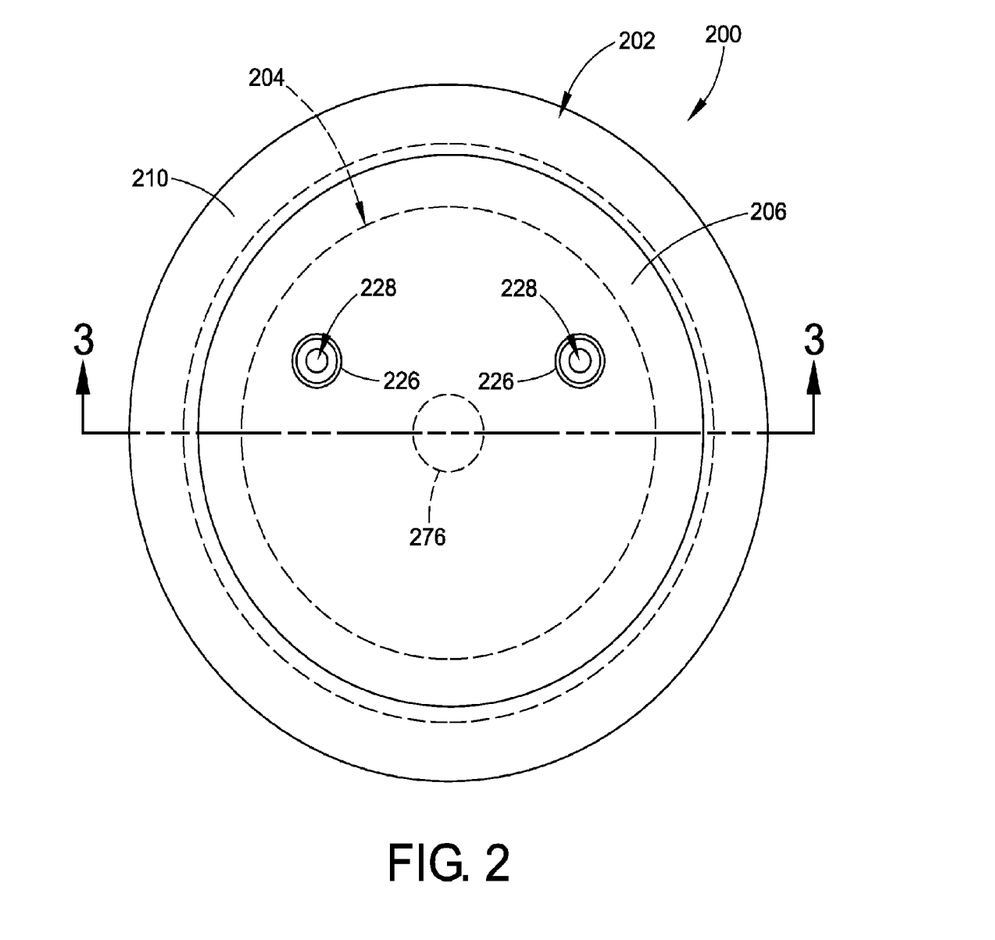
FIG. 2 is a top plan view of one example of a gas spring and gas damper assembly in accordance with the subject matter of the present disclosure.
Figure 3:
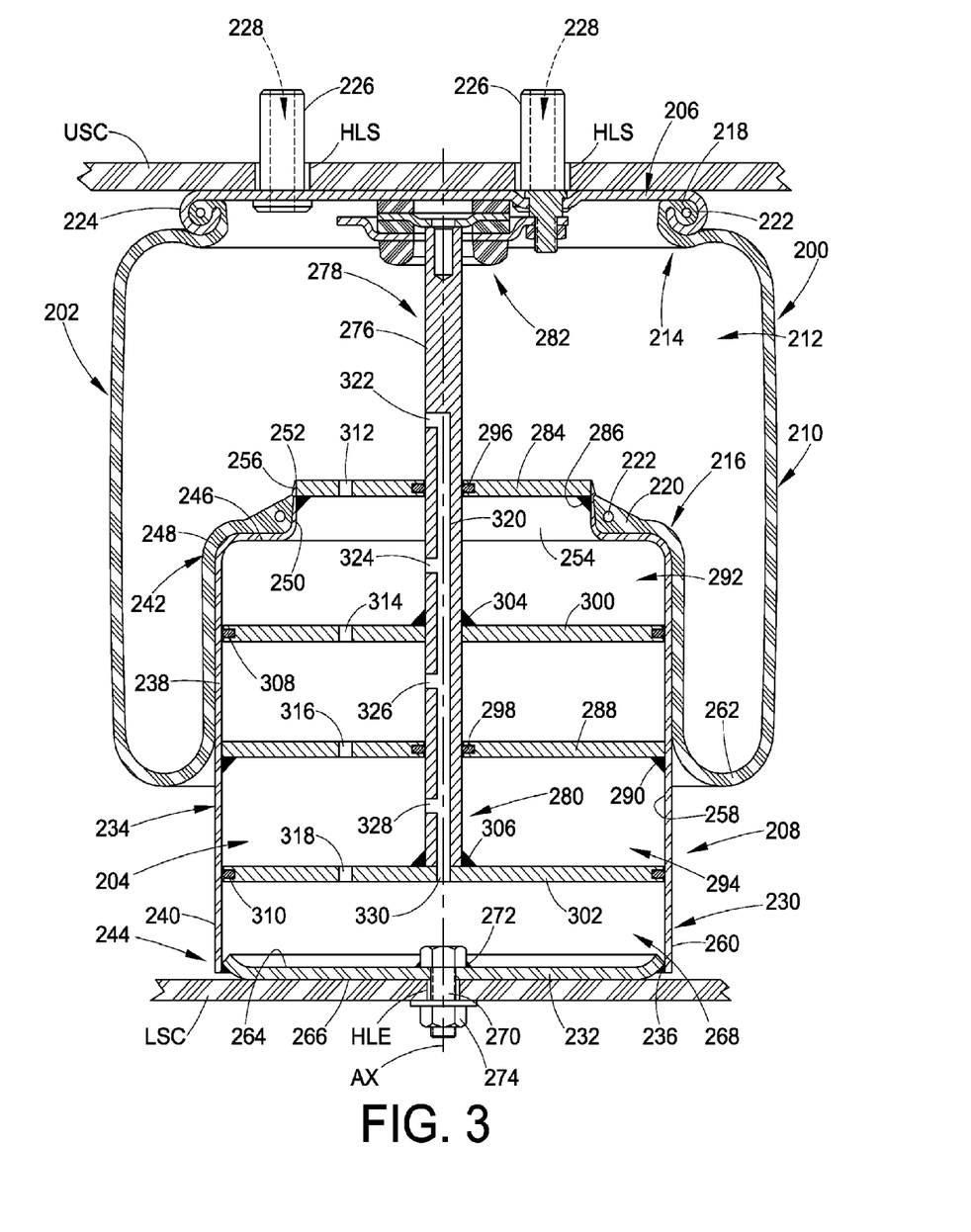
FIG. 3 is a cross-sectional side view of the gas spring and gas damper assembly shown in FIG. 2 taken from along line 3-3 thereof.

One example of a gas spring and gas damper assembly 200 in accordance with the subject matter of the present disclosure, such as may be suitable for use as assemblies 110 in FIG.

1, for example, is shown in FIGS. 2 and 3. Gas spring and gas damper assembly 200 includes a gas spring assembly 202 and a gas damper assembly 204 that is substantially-entirely housed within the gas spring assembly. Gas spring assembly 202 can be of any type, kind, construction, configuration and/or arrangement, such as are shown in FIGS. 1 and 3 as being of a rolling lobe-type construction, for example, and can have a longitudinal axis and can include a first end member, an opposing second end member spaced longitudinally from the first end member and a flexible wall that is operatively connected therebetween. It will be appreciated, however, that other gas spring assembly constructions could alternately be used, such as a convoluted bellow-type construction, for example. Additionally, gas spring assembly 202 can operatively connected between opposing structural components in any suitable manner, such as, for example, are generally represented in FIG. 3 by upper structural component USC (e.g., vehicle body 102 in FIG. 1) and lower structural component LSC (e.g., axle 104 in FIG. 1).

In the exemplary arrangement shown in FIGS. 2 and 3, gas spring assembly 202 has a longitudinally-extending axis AX and includes a first or upper end member, such as a bead plate 206, for example, and an opposing second or lower end member, such as a piston 208, for example, that is spaced longitudinally from the first end member. A flexible spring member (or flexible sleeve) 210 can be secured between the first end member (e.g., bead plate 206) and the second end member (e.g., piston 208) in a suitable manner such that a spring chamber 212 is at least partially formed therebetween.

Flexible sleeve 210 includes a flexible wall (not numbered) that extends peripherally about axis AX and in a generally longitudinal manner between a sleeve end 214 and a sleeve end 216. Flexible sleeve 210 can also include a mounting bead 218 along sleeve end 214 and a mounting bead 220 along sleeve end 216. Mounting beads 218 and 220 can optionally include a reinforcing element or other suitable component, such as a bead wire 222, for example.

End 214 of flexible sleeve 210 can be secured on or along the end member in any suitable manner. For example, mounting bead 218 of the flexible sleeve can be captured by an outer peripheral edge 224 of bead plate 206. The peripheral edge can be deformed around mounting bead 218 in any manner suitable for forming a substantially fluid-tight seal therewith. One or more securement devices, such as mounting studs 226, for example, can be included along bead plate 206 and project through the associated structural component (e.g., upper structural component USC) in a manner suitable for receiving a corresponding securement device or element (not shown) to secure the first end member to the associated structural component. In the exemplary embodiment shown in FIG. 3, mounting studs 226 project axially outwardly from the bead plate and extend through holes HLS in upper structural component USC.

Additionally, a fluid communication port, such as a fluid passage 228, for example, can optionally be provided on or along the first or upper end member to permit fluid communication with spring chamber 212. In the exemplary embodiment shown, fluid passages 228 extend through mounting studs 226 and are in fluid communication with the spring chamber. It will be appreciated, however, that any other suitable fluid communication arrangement could alternately be used.

Mounting bead 220 of flexible sleeve 210 can be secured to the second end member in any suitable manner. As one example, the mounting bead could be retained on or along the piston using one or more retaining elements or components (e.g., crimp rings or retaining caps). As another example, mounting bead 220 could be friction fit along a wall portion of piston 208 and, optionally, at least partially retained thereon using a radially outwardly-extending projection. It will be appreciated, however, that any other suitable arrangement and/or configuration could alternately be used.

In the exemplary embodiment in FIGS. 2 and 3, for example, piston 208 is shown as including piston body 230 that is formed from a base member 232 and an outer shell 234, which is operatively connected to the base member such that a substantially fluid-tight seal is formed therebetween, such as through the use of a flowed-material joint 236 extending circumferentially about axis AX, for example. It will be appreciated, however, that in other cases, a piston body could be used in which the base member and outer shell are integrally formed with one another, such as through the use of an injection molding process, for example. In such case, the base member could be alternately referred to as a base portion or base member portion, and the outer shell could be alternately referred to as an outer shell portion.

As identified in FIG. 3, outer shell (or outer shell portion) 234 includes a shell wall 238 that extends circumferentially about axis AX. Shell wall 238 includes an outer side wall portion 240 that extends in a generally longitudinal direction between an end 242, which is disposed toward bead plate 206, and an end 244, which is disposed in longitudinally spaced relation to end 242 and toward lower structural component LSC. Shell wall 238 also includes an end wall portion 246 that transitions into outer side wall portion 240 at a curved or shoulder portion 248. An inner side wall portion 250 projects from end wall portion 246 in a direction extending axially away from end 244. Inner side wall portion 250 terminates in the axial direction at an end 252. Additionally, inner side wall portion 250 includes an outer surface (not numbered) facing radially outward and an inner surface 254 facing radially inward. A projection 256 extends radially-outwardly from along the outer surface adjacent end 252 of inner side wall portion 250.

It will be recognized that a wide variety of shapes, profiles and/or configurations can and have been used in forming the outer side wall of a gas spring piston. As such, it will be appreciated that outer side wall portion 240 of shell wall 238 can be of any suitable shape, profile and/or configuration and that the profile shown in FIG. 3 is merely exemplary. Mounting bead 220 of flexible sleeve 210 can be received on or along the outer surface of inner side wall portion 250 such that a substantially fluid-tight seal is formed therebetween with projection 256 at least partially retaining mounting bead 220 on inner side wall portion 250. Additionally, outer side wall portion 240 of shell wall 238 includes an inside surface 258 and an outside surface 260. As such, a portion of flexible sleeve 210 extends along end wall portion 246 and outside surface 260 of outer side wall portion 240 such that a rolling lobe 262 is formed along piston body 230 and is displaced along the outer side wall portion as the gas spring assembly undergoes changes in overall height.

Base member 232 includes an inside surface 264 and an outside surface 266, which can be disposed in abutting engagement with lower structural component LSC. Inside surface 264 of base member 232 and inside surface 258 of outer side wall portion 240 at least partially define a piston chamber 268 within piston 208. Additionally, it will be appreciated that piston 208 can be secured on or along the associated structural component (e.g., lower structural component LSC) in any suitable manner. As one example, a securement device, such as a mounting stud 270, for example, can be secured on or along base member 232 in a substantially fluid-tight manner, such as by way of a flowed-material joint 272, for example. Mounting stud 270 can include one or more helical threads and can project axially through the base member. In the arrangement shown in FIG. 3, mounting stud 270 extends through a mounting hole HLE in a lower structural component LSC and receives a corresponding threaded nut 274 that thereby secures the piston in abutting engagement with the lower structural component. It will be appreciated, however, that other configurations and/or arrangements could alternately be used.

Gas damper assembly 204 is shown in FIGS. 2 and 3 as being substantially entirely disposed within gas spring assembly 202, and including a damper rod 276 that extends lengthwise between opposing ends 278 and 280. End 278 is disposed adjacent bead plate 206, and damper rod 276 can be secured thereto in any suitable manner. It will be appreciated that in many cases the opposing end members (e.g., bead plate 206 and piston 208) of a gas spring assembly are not displaced relative to one another in a wholly axial manner. Rather, some angular and/or arcuate displacement of the opposing end member commonly occurs during normal use in operation. As such, gas damper assembly is preferably secured on or otherwise between the opposing end members of the gas spring assembly by way of one or more articulable or otherwise flexible mounting arrangements. In the exemplary arrangement shown in FIG. 3, for example, damper rod 276 is secured on or along bead plate 206 by way of a flexible mounting assembly 282 that permits angular displacement of the damper rod relative to the bead plate. It will be appreciated, however, that other configurations and/or arrangements could alternately be used.

Gas damper assembly 204 also includes two or more damping chambers that include a corresponding number of two or more damper pistons, each disposed within one of the damping chambers. Additionally, the two or more damping chambers are disposed in series with one another and are of a substantially fixed volume. In the exemplary arrangement shown in FIGS. 2 and 3, the two or more damping chambers are disposed within and at least partially defined by piston chamber 268 of piston 208. It will be appreciated, however, that other configurations could alternately be used, such as by providing a separate structure within the gas spring assembly to at least partially define the damping chambers.

In the arrangement shown in FIG. 3, a cover wall 284 is disposed across the opening formed by inner side wall portion 250 and is secured thereto such that a substantially fluid-tight seal is formed therebetween, such as by way of a flowed-material joint 286, for example. Additionally, a partition wall 288 extends across piston chamber 268 in a direction transverse to axis AX and is secured to side wall portion 240 of shell wall 238 such that a substantially fluid-tight seal is formed therebetween, such as by way of a flowed-material joint 290, for example. As such, piston chamber 268 is separated into a plurality of damping chambers 292 and 294 that have a substantially fixed volume. Damping chamber 292 is at least partially defined by at least side wall portion 240 and end wall portion 246 of shell wall 238 between cover wall 284 and partition wall 288. Damping chamber 294 is at least partially defined by at least side wall portion 240 of shell wall 238 between partition wall 288 and inside surface 264 of base member 232. It will be appreciated that one or more additional partition walls and a corresponding number of one or more damping chambers can, optionally, be included.

Cover wall 284 and partition wall 288 each include a rod passage (not numbered) extending therethrough that is dimensioned to receive damper rod 276 such that the damper rod can extend into damping chambers 292 and 294. Damper rod 276 undergoes reciprocal displacement relative to cover wall 284 and partition wall 288 during dynamic use and operation of gas spring and gas damper assembly 200. It will be recognized and appreciated that significant frictional forces may be generated during such reciprocal displacement of the damper rod. As such, in some cases, it may be desirable to avoid such frictional forces (or for other reasons). In such case, a friction reducing bushing or wear band (not shown) can, optionally, be disposed between the damper rod and one or more of the cover and partition walls. Additionally, or in the alternative, it may be desirable to establish and/or maintain a substantially fluid-tight seal between damper rod 276 and one or more of cover wall 284 and partition wall 288. In such case, one or more sealing elements can be sealingly disposed between the damper rod and one or more of the cover and/or partition walls. In the arrangement shown in FIG. 3, for example, sealing elements 296 and 298 are respectively disposed along the rod passages of cover wall 284 and partition wall 288, and form a substantially fluid-tight seal with damper rod 276. It will be appreciated, however, that other configurations and/or arrangements could alternately be used.

Gas damper assembly 204 also includes two or more damper pistons that are each operatively disposed with a corresponding one of the two or more damping chambers. In the exemplary arrangement shown in FIG. 3, gas damper assembly 204 includes damper pistons 300 and 302 that are disposed in spaced relation to one another along damper rod 276 with damper piston 300 positioned within damping chamber 292 and damper piston 302 positioned within damping chamber 294. In the arrangement shown, damper pistons are oriented transverse to axis AX and extend substantially entirely across the corresponding damping chambers and terminate at outer peripheral edges (not numbered) that are disposed adjacent inside surface 258 of outer side wall portion 240 of shell wall 238. It will be appreciated, however, that one or more additional damper pistons can, optionally, be included in cases in which a corresponding number of one or more additional damping chambers is included.

In a preferred arrangement, damper pistons 300 and 302 are retained in fixed positions on or along damper rod 276, and can be secured to the damper rod such that a substantially fluid-tight seal is formed therebetween, such as by way of one or more flowed-material joints 304 and 306, for example. Due at least in part to the substantially fixed securement between the damper rod and the damper pistons, it will be appreciated that the damper pistons undergo reciprocal displacement relative to inside surface 258 of outer side wall portion 240 of shell wall 238 during dynamic use and operation of gas spring and gas damper assembly 200. It will be recognized and appreciated that significant frictional forces may be generated during such reciprocal displacement of the damper pistons. As such, in some cases, it may be desirable to avoid such frictional forces (or for other reasons). In such case, a friction reducing bushing or wear band (not shown) can, optionally, be disposed between the inside surface of the outer side wall portion and one or more of the damper pistons. Additionally, or in the alternative, it may be desirable to establish and/or maintain a substantially fluid-tight seal between inside surface 258 of outer side wall portion 240 and one or more of damper pistons 300 and/or 302. In such case, one or more sealing elements can be sealingly disposed between the inside surface and one or more of the damper pistons. In the arrangement shown in FIG. 3, for example, sealing elements 308 and 310 are respectively disposed along the outer peripheral edges of damper pistons 300 and 302, and form a substantially fluid-tight seal with inside surface 258 of outer side wall portion 240 of shell wall 238. It will be appreciated, however, that other configurations and/or arrangements could alternately be used.

Damper piston 300 is disposed within damping chamber 292 and separates the damping chamber into chamber portions 292A and 292B. Similarly, damper piston 302 is disposed within damping chamber 294 and separates the damping chamber into chamber portions 294A and 294B. As such, during displacement of bead plate 206 and piston 208 toward one another, damper pistons 300 and 302 are respectively displaced toward partition wall 288 and base member 232. Under such conditions, chamber portions 292A and 294A increase in volume, and chamber portions 292B and 294B decrease in volume. During displacement of bead plate 206 and piston 208 away from one another, damper pistons 300 and 302 are respectively displaced toward cover wall 284 and partition wall 288. Under such conditions, chamber portions 292A and 294A decrease in volume, and chamber portions 292B and 294B increase in volume.

It will be appreciated that these changes in volume of the different chamber portions will result in the development of pressure differentials between the chamber portions as well as between chambers 212, 292 and 294. Such differential pressures can be utilized to generate pressurized gas flow from volumes of higher pressure to volumes of lower pressure, and such pressurized gas flow can, in some cases, be utilized to dissipate energy acting on gas spring and gas damper assembly 200.

To permit pressurized gas flow between the different chambers and/or chamber portions of gas damper assembly 204, a plurality of orifices can be included on or along any one or more of cover wall 284, partition wall 288, damper piston 300 and/or damper piston 302. In some cases, orifices can also be included on or along damper rod 276. In the arrangement shown in FIG. 3, cover wall 284 includes an orifice 312 that permits fluid communication between spring chamber 212 and damping chamber 292, and partition wall 288 includes an orifice 314 that permits fluid communication between damping chambers 292 and 294. Additionally, damper piston 300 includes an orifice 316 that permits fluid communication between chamber portions 292A and 292B, and damper piston 302 includes an orifice 318 that permits fluid communication between chamber portions 294A and 294B.

Additionally, or in the alternative, damper rod 276 can include a gas transfer passage 320 extending lengthwise along at least a portion thereof. Damper rod 276 can also, optionally, include one or more orifices in fluid communication with gas transfer passage 320. For example, damper rod 276 is shown in FIG. 3 as including an orifice 322 in fluid communication with spring chamber 212, an orifice 324 in fluid communication with chamber portion 292A, an orifice 326 in fluid communication with chamber portion 292B, an orifice 328 in fluid communication with chamber portion 294A, and an orifice 330 in fluid communication with chamber portion 294B.

It will be recognized that orifices 312-318 and 322-330 are shown in FIG. 3 as being approximately the same size and shape. However, it will be appreciated that orifices of different sizes, shapes, quantities and/or configurations can alternately be used. Additionally, it is to be understood that the sizes, shapes, quantities and/or configurations of orifices can be varied according to desired performance characteristics of the gas spring and gas damper assembly, such as to target particular ranges of frequencies for damping, for example.

Figure 4:
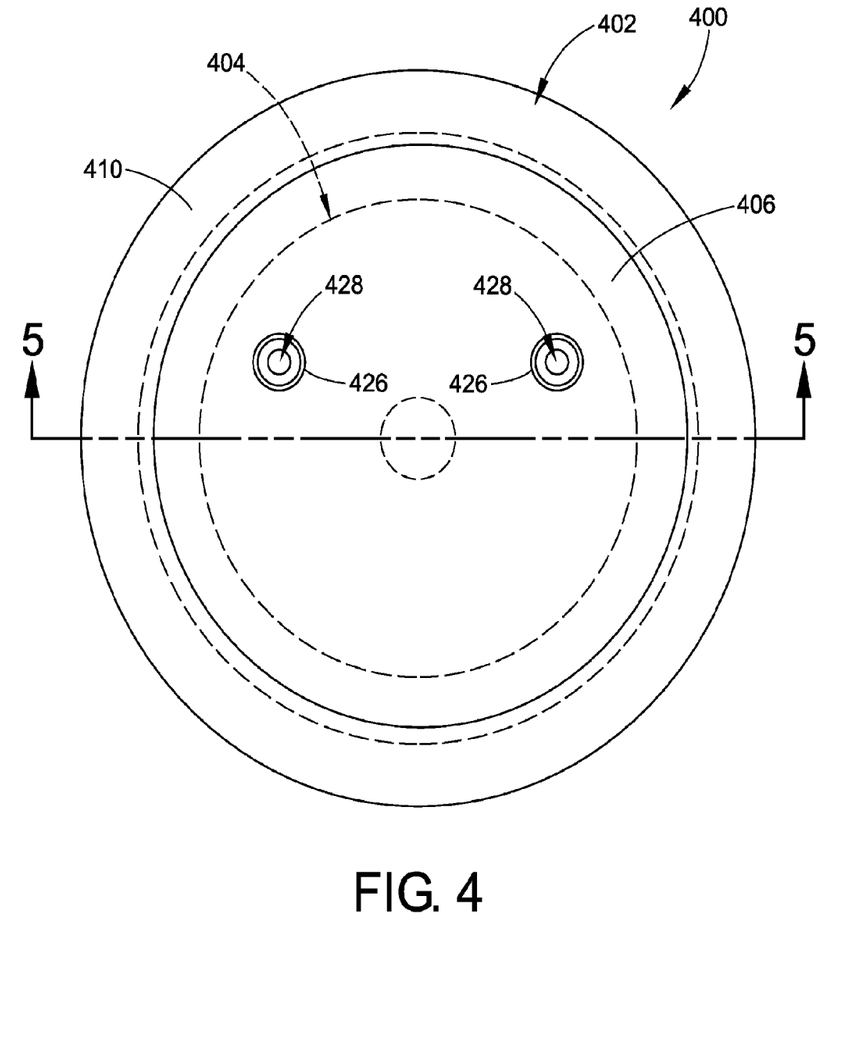
FIG. 4 is a top plan view of another example of a gas spring and gas damper assembly in accordance with the subject matter of the present disclosure.
Figure 5:
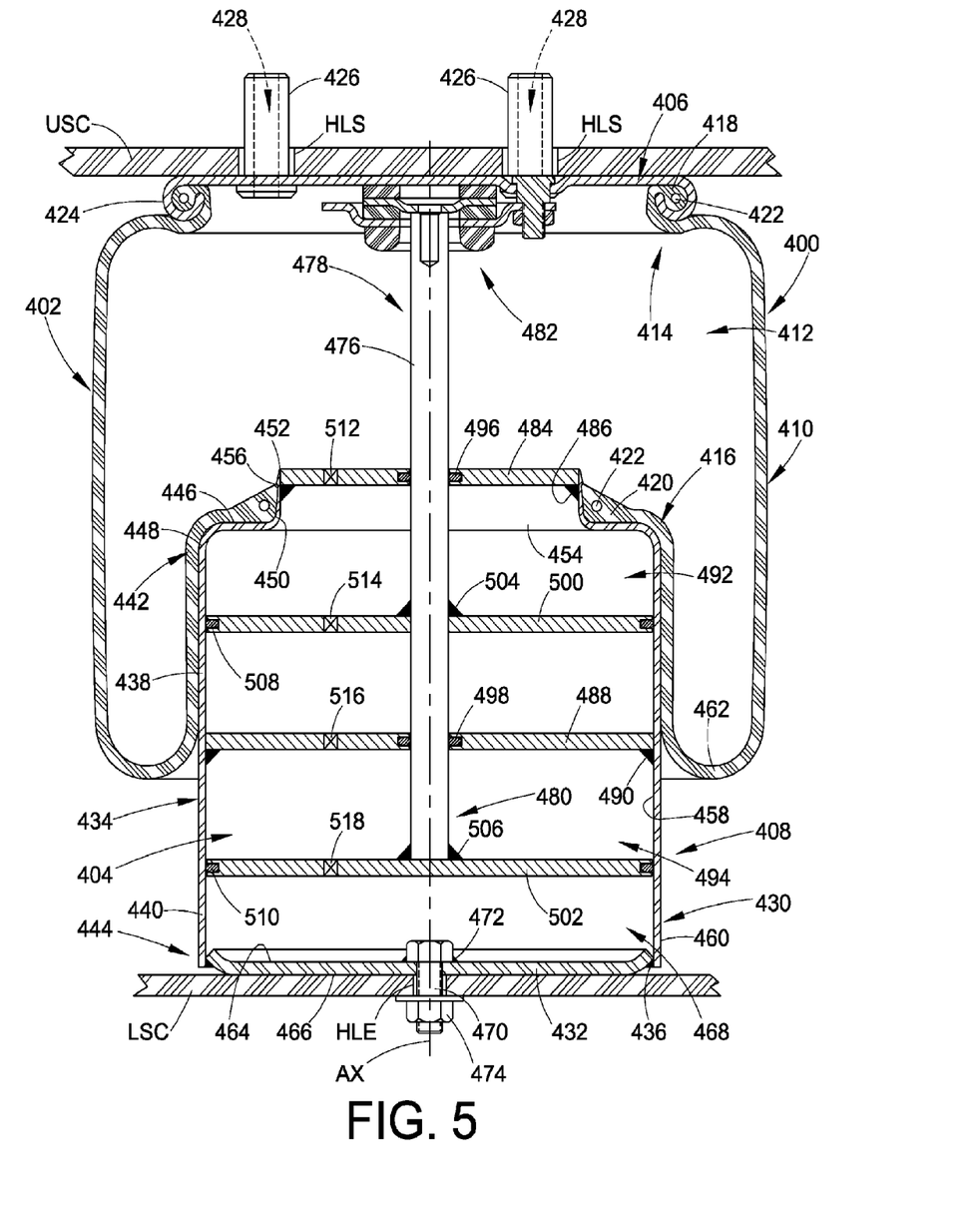
FIG. 5 is a cross-sectional side view of the gas spring and gas damper assembly shown in FIG. 4 taken from along line 5-5 thereof.

Another example of a gas spring and gas damper assembly 400 in accordance with the subject matter of the present disclosure, such as may be suitable for use as assemblies 110 in FIG. 1, for example, is shown in FIGS. 4 and 5. Gas spring and gas damper assembly 400 includes a gas spring assembly 402 and a gas damper assembly 404 that is substantially-entirely housed within the gas spring assembly. Gas spring assembly 402 can be of any type, kind, construction, configuration and/or arrangement, such as are shown in FIGS. 1 and 5 as being of a rolling lobe-type construction, for example, and can have a longitudinal axis and can include a first end member, an opposing second end member spaced longitudinally from the first end member and a flexible wall that is operatively connected therebetween. It will be appreciated, however, that other gas spring assembly constructions could alternately be used, such as a convoluted bellow-type construction, for example. Additionally, gas spring assembly 402 can operatively connected between opposing structural components in any suitable manner, such as, for example, are generally represented in FIG. 5 by upper structural component USC (e.g., vehicle body 102 in FIG. 1) and lower structural component LSC (e.g., axle 104 in FIG. 1).

In the exemplary arrangement shown in FIGS. 4 and 5, gas spring assembly 402 has a longitudinally-extending axis AX and includes a first or upper end member, such as a bead plate 406, for example, and an opposing second or lower end member, such as a piston 408, for example, that is spaced longitudinally from the first end member. A flexible spring member (or flexible sleeve) 410, for example, can be secured between the first end member (e.g., bead plate 406) and the second end member (e.g., piston 408) in a suitable manner such that a spring chamber 412 is at least partially formed therebetween.

Flexible sleeve 410 includes a flexible wall (not numbered) that extends peripherally about axis AX and in a generally longitudinal manner between a sleeve end 414 and a sleeve end 416. Flexible sleeve 410 can also include a mounting bead 418 along sleeve end 414 and a mounting bead 420 along sleeve end 416. Mounting beads 418 and 420 can optionally include a reinforcing element or other suitable component, such as a bead wire 422, for example.

End 414 of flexible sleeve 410 can be secured on or along the end member in any suitable manner. For example, mounting bead 418 of the flexible sleeve can be captured by an outer peripheral edge 424 of bead plate 406. The peripheral edge can be deformed around mounting bead 418 in any manner suitable for forming a substantially fluid-tight seal therewith. One or more securement devices, such as mounting studs 426, for example, can be included along bead plate 406 and project through the associated structural component (e.g., upper structural component USC) in a manner suitable for receiving a corresponding securement device or element (not shown) to secure the first end member to the associated structural component. In the exemplary embodiment shown in FIG. 5, mounting studs 426 project axially outwardly from the bead plate and extend through holes HLS in upper structural component USC.

Additionally, a fluid communication port, such as a fluid passage 428, for example, can optionally be provided on or along the first or upper end member to permit fluid communication with spring chamber 412. In the exemplary embodiment shown, fluid passages 428 extend through mounting studs 426 and are in fluid communication with the spring chamber. It will be appreciated, however, that any other suitable fluid communication arrangement could alternately be used.

Mounting bead 420 of flexible sleeve 410 can be secured to the second end member in any suitable manner. As one example, the mounting bead could be retained on or along the piston using one or more retaining elements or components (e.g., crimp rings or retaining caps). As another example, mounting bead 420 could be friction fit along a wall portion of piston 408 and, optionally, at least partially retained thereon using a radially outwardly-extending projection. It will be appreciated, however, that any other suitable arrangement and/or configuration could alternately be used.

In the exemplary embodiment in FIGS. 4 and 5, for example, piston 408 is shown as including piston body 430 that is formed from a base member 432 and an outer shell 434, which is operatively connected to the base member such that a substantially fluid-tight seal is formed therebetween, such as through the use of a flowed-material joint 436 extending circumferentially about axis AX, for example. It will be appreciated, however, that in other cases, a piston body could be used in which the base member and outer shell are integrally formed with one another, such as through the use of an injection molding process, for example. In such case, the base member could be alternately referred to as a base portion or base member portion, and the outer shell could be alternately referred to as an outer shell portion.

As identified in FIG. 5, outer shell (or outer shell portion) 434 includes a shell wall 438 that extends circumferentially about axis AX. Shell wall 438 includes an outer side wall portion 440 that extends in a generally longitudinal direction between an end 442, which is disposed toward bead plate 406, and an end 444, which is disposed in longitudinally spaced relation to end 442 and toward lower structural component LSC. Shell wall 438 also includes an end wall portion 446 that transitions into outer side wall portion 440 at a curved or shoulder portion 448. An inner side wall portion 450 projects from end wall portion 446 in a direction extending axially away from end 444. Inner side wall portion 450 terminates in the axial direction at an end 452. Additionally, inner side wall portion 450 includes an outer surface (not numbered) facing radially outward and an inner surface 454 facing radially inward. A projection 456 extends radially-outwardly from along the outer surface adjacent end 452 of inner side wall portion 450.

It will be recognized that a wide variety of shapes, profiles and/or configurations can and have been used in forming the outer side wall of a gas spring piston. As such, it will be appreciated that outer side wall portion 440 of shell wall 438 can be of any suitable shape, profile and/or configuration and that the profile shown in FIG. 5 is merely exemplary. Mounting bead 420 of flexible sleeve 410 can be received on or along the outer surface of inner side wall portion 450 such that a substantially fluid-tight seal is formed therebetween with projection 456 at least partially retaining mounting bead 420 on inner side wall portion 450. Additionally, outer side wall portion 440 of shell wall 438 includes an inside surface 458 and an outside surface 460. As such, a portion of flexible sleeve 410 extends along end wall portion 446 and outside surface 460 of outer side wall portion 440 such that a rolling lobe 462 is formed along piston body 430 and is displaced along the outer side wall portion as the gas spring assembly undergoes changes in overall height.

Base member 432 includes an inside surface 464 and an outside surface 466, which can be disposed in abutting engagement with lower structural component LSC. Inside surface 464 of base member 432 and inside surface 458 of outer side wall portion 440 at least partially define a piston chamber 468 within piston 408. Additionally, it will be appreciated that piston 408 can be secured on or along the associated structural component (e.g., lower structural component LSC) in any suitable manner. As one example, a securement device, such as a mounting stud 470, for example, can be secured on or along base member 432 in a substantially fluid-tight manner, such as by way of a flowed-material joint 472, for example. Mounting stud 470 can include one or more helical threads and can project axially through the base member. In the arrangement shown in FIG. 5, mounting stud 470 extends through a mounting hole HLE in lower structural component LSC and receives a corresponding threaded nut 474 that thereby secures the piston in abutting engagement with the lower structural component. It will be appreciated, however, that other configurations and/or arrangements could alternately be used.

Gas damper assembly 404 is shown in FIGS. 4 and 5 as being substantially entirely disposed within gas spring assembly 402, and including a damper rod 476 that extends lengthwise between opposing ends 478 and 480. End 478 is disposed adjacent bead plate 406, and damper rod 476 can be secured thereto in any suitable manner. It will be appreciated that in many cases the opposing end members (e.g., bead plate 406 and piston 408) of a gas spring assembly are not displaced relative to one another in a wholly axial manner. Rather, some angular and/or arcuate displacement of the opposing end member commonly occurs during normal use in operation. As such, gas damper assembly is preferably secured on or otherwise between the opposing end members of the gas spring assembly by way of one or more articulable or otherwise flexible mounting arrangements. In the exemplary arrangement shown in FIG. 5, for example, damper rod 476 is secured on or along bead plate 406 by way of a flexible mounting assembly 482 that permits angular displacement of the damper rod relative to the bead plate. It will be appreciated, however, that other configurations and/or arrangements could alternately be used.

Gas damper assembly 404 also includes two or more damping chambers that include a corresponding number of two or more damper pistons, each disposed within one of the damping chambers. Additionally, the two or more damping chambers are disposed in series with one another and are of a substantially fixed volume. In the exemplary arrangement shown in FIGS. 4 and 5, the two or more damping chambers are disposed within and at least partially defined by piston chamber 468 of piston 408. It will be appreciated, however, that other configurations could alternately be used, such as by providing a separate structure within the gas spring assembly to at least partially define the damping chambers.

In the arrangement shown in FIG. 5, a cover wall 484 is disposed across the opening formed by inner side wall portion 450 and is secured thereto such that a substantially fluid-tight seal is formed therebetween, such as by way of a flowed-material joint 486, for example. Additionally, a partition wall 488 extends across piston chamber 468 in a direction transverse to axis AX and is secured to side wall portion 440 of shell wall 438 such that a substantially fluid-tight seal is formed therebetween, such as by way of a flowed-material joint 490, for example. As such, piston chamber 468 is separated into a plurality of damping chambers 492 and 494 that have a substantially fixed volume. Damping chamber 492 is at least partially defined by at least side wall portion 440 and end wall portion 446 of shell wall 438 between cover wall 484 and partition wall 488. Damping chamber 494 is at least partially defined by at least side wall portion 440 of shell wall 438 between partition wall 488 and inside surface 464 of base member 432. It will be appreciated that one or more additional partition walls and a corresponding number of one or more damping chambers can, optionally, be included.

Cover wall 484 and partition wall 488 each include a rod passage (not numbered) extending therethrough that is dimensioned to receive damper rod 476 such that the damper rod can extend into damping chambers 492 and 494. Damper rod 476 undergoes reciprocal displacement relative to cover wall 484 and partition wall 488 during dynamic use and operation of gas spring and gas damper assembly 400. It will be recognized and appreciated that significant frictional forces may be generated during such reciprocal displacement of the damper rod. As such, in some cases, it may be desirable to avoid such frictional forces (or for other reasons). In such case, a friction reducing bushing or wear band (not shown) can, optionally, be disposed between the damper rod and one or more of the cover and partition walls. Additionally, or in the alternative, it may be desirable to establish and/or maintain a substantially fluid-tight seal between damper rod 476 and one or more of cover wall 484 and partition wall 488. In such case, one or more sealing elements can be sealingly disposed between the damper rod and one or more of the cover and/or partition walls. In the arrangement shown in FIG. 5, for example, sealing elements 496 and 498 are respectively disposed along the rod passages of cover wall 484 and partition wall 488, and form a substantially fluid-tight seal with damper rod 476. It will be appreciated, however, that other configurations and/or arrangements could alternately be used.

Gas damper assembly 404 also includes two or more damper pistons that are each operatively disposed with a corresponding one of the two or more damping chambers. In the exemplary arrangement shown in FIG. 5, gas damper assembly 404 includes damper pistons 500 and 502 that are disposed in spaced relation to one another along damper rod 476 with damper piston 500 positioned within damping chamber 492 and damper piston 502 positioned within damping chamber 494. In the arrangement shown, damper pistons are oriented transverse to axis AX and extend substantially entirely across the corresponding damping chambers and terminate at outer peripheral edges (not numbered) that are disposed adjacent inside surface 458 of outer side wall portion 440 of shell wall 438. It will be appreciated, however, that one or more additional damper pistons can, optionally, be included in cases in which a corresponding number of one or more additional damping chambers is included.

In a preferred arrangement, damper pistons 500 and 502 are retained in fixed positions on or along damper rod 476, and can be secured to the damper rod such that a substantially fluid-tight seal is formed therebetween, such as by way of one or more flowed-material joints 504 and 506, for example. Due at least in part to the substantially fixed securement between the damper rod and the damper pistons, it will be appreciated that the damper pistons undergo reciprocal displacement relative to inside surface 458 of outer side wall portion 440 of shell wall 438 during dynamic use and operation of gas spring and gas damper assembly 400. It will be recognized and appreciated that significant frictional forces may be generated during such reciprocal displacement of the damper pistons. As such, in some cases, it may be desirable to avoid such frictional forces (or for other reasons). In such case, a friction reducing bushing or wear band (not shown) can, optionally, be disposed between the inside surface of the outer side wall portion and one or more of the damper pistons. Additionally, or in the alternative, it may be desirable to establish and/or maintain a substantially fluid-tight seal between inside surface 458 of outer side wall portion 440 and one or more of damper pistons 500 and/or 502. In such case, one or more sealing elements can be sealingly disposed between the inside surface and one or more of the damper pistons. In the arrangement shown in FIG. 5, for example, sealing elements 508 and 510 are respectively disposed along the outer peripheral edges of damper pistons 500 and 502, and form a substantially fluid-tight seal with inside surface 458 of outer side wall portion 440 of shell wall 438. It will be appreciated, however, that other configurations and/or arrangements could alternately be used.

Damper piston 500 is disposed within damping chamber 492 and separates the damping chamber into chamber portions 492A and 492B. Similarly, damper piston 502 is disposed within damping chamber 494 and separates the damping chamber into chamber portions 494A and 494B. As such, during displacement of bead plate 406 and piston 408 toward one another, damper pistons 500 and 502 are respectively displaced toward partition wall 488 and base member 432. Under such conditions, chamber portions 492A and 494A increase in volume, and chamber portions 492B and 494B decrease in volume. During displacement of bead plate 406 and piston 408 away from one another, damper pistons 500 and 502 are respectively displaced toward cover wall 484 and partition wall 488. Under such conditions, chamber portions 492A and 494A decrease in volume, and chamber portions 492B and 494B increase in volume.

It will be appreciated that these changes in volume of the different chamber portions will result in the development of pressure differentials between the chamber portions as well as between chambers 412, 492 and 494. Such differential pressures can be utilized to dissipate energy acting on gas spring and gas damper assembly 400. However, rather than utilizing the pressure differentials to generate pressurized gas flow through orifices, one or more valves are selectively opened for a short period of time to permit pressure equalization between adjacent chambers and/or chamber portions.

To permit pressure equalization between the different chambers and/or chamber portions of gas damper assembly 404, a plurality of electrically-actuatable valves can be included on or along any one or more of cover wall 484, partition wall 488, damper piston 500 and/or damper piston 502. In the arrangement shown in FIG. 5, cover wall 484 includes a valve 512 that permits fluid communication between spring chamber 412 and damping chamber 492, and partition wall 488 includes a valve 514 that permits fluid communication between damping chambers 492 and 494. Additionally, damper piston 500 includes a valve 516 that permits fluid communication between chamber portions 492A and 492B, and damper piston 502 includes a valve 518 that permits fluid communication between chamber portions 494A and 494B.

As indicated above, valves 512-518 can be electrically-actuatable valves of any suitable type, kind, configuration and/or construction. Additionally, valves 512-518 can be selectively actuated in any suitable manner. As one example, valves 512-518 can each be communicatively coupled with a controller of a suitable system or device, such as electronic control unit 134 of control system 132 in FIG. 1, for example.

Figure 6:
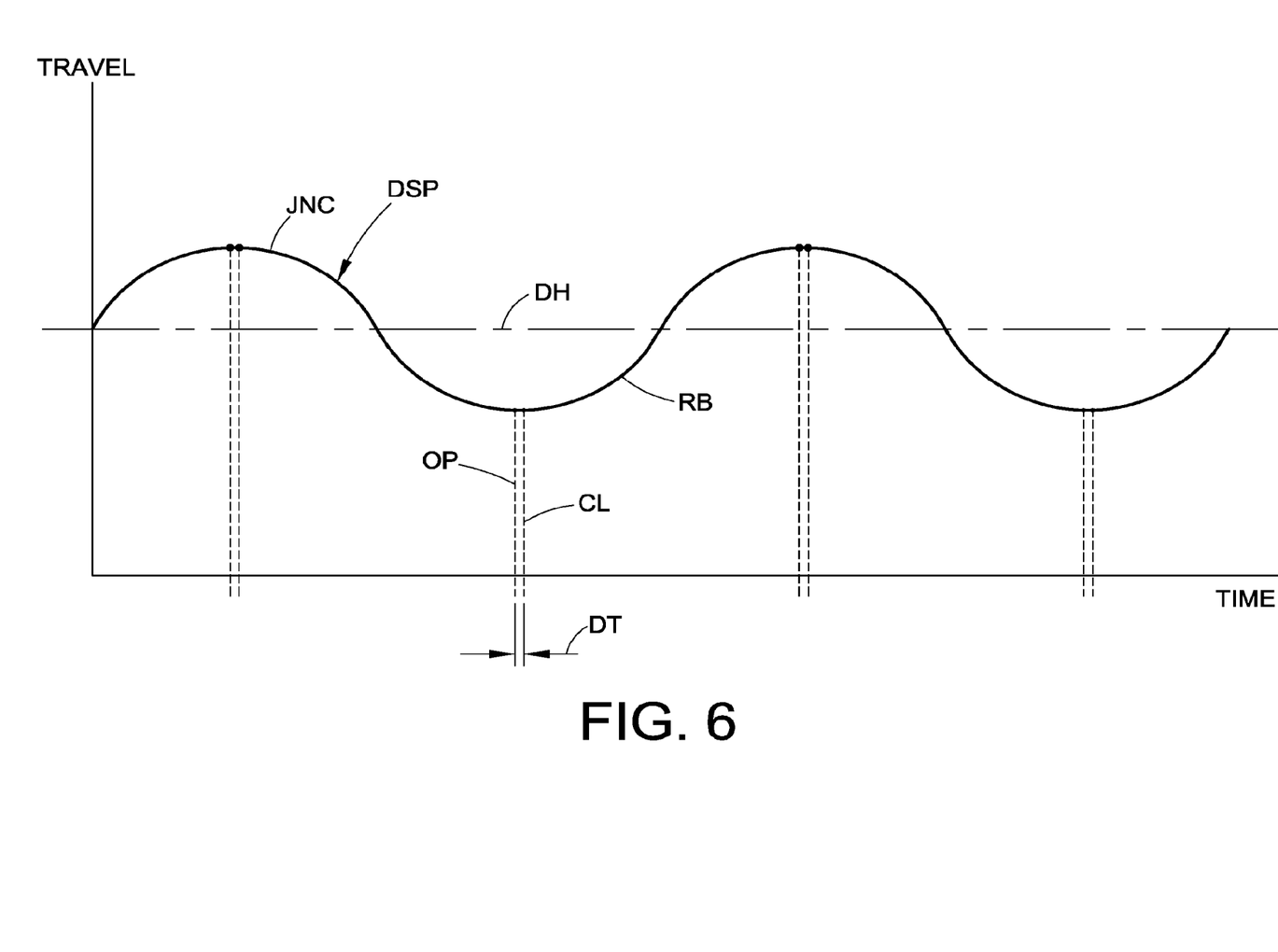
FIG. 6 is a graphical representation of valve actuation timing in relation to displacement of the gas spring and gas damper assembly shown in FIGS. 4 and 5.

FIG. 6 is a graphical representation of one example of valve actuation timing that may be suitable for use in connection with the operation of gas spring and gas damper assembly 400. FIG. 6 illustrates gas spring assembly travel versus time, and includes a line representing the design height DH of the gas spring assembly. Portions of spring displacement line DSP that are disposed above design height DH represent travel of the gas spring assembly in a jounce direction JNC and portions of the spring displacement line that are disposed below the design height represent travel of the gas spring assembly in a rebound direction RB. In some cases, one or more of valves 512-518 can be selective opened and closed in a manner represented in FIG. 6 by open line OP and close line CL, which in some cases can occur during the extreme position of the gas spring assembly during rebound, for example. It will be appreciated that a differential time DT between opening and closing of the one or more valves is short, such as a differential time within a range of from about 10 milliseconds to about 500 milliseconds, for example. Though actuation (e.g., opening and closing) of the valves is represented in FIG. 6 as occurring during both jounce and rebound travel, it will be appreciated that in some cases it may be beneficial to selectively actuate one or more of the valves in only one direction of travel.

As used herein with reference to certain features, elements, components and/or structures, numerical ordinals (e.g., first, second, third, fourth, etc.) may be used to denote different singles of a plurality or otherwise identify certain features, elements, components and/or structures, and do not imply any order or sequence unless specifically defined by the claim language. Additionally, the terms "transverse," and the like, are to be broadly interpreted. As such, the terms "transverse," and the like, can include a wide range of relative angular orientations that include, but are not limited to, an approximately perpendicular angular orientation.

Furthermore, the phrase "flowed-material joint" and the like are to be interpreted to include any joint or connection in which a liquid or otherwise flowable material (e.g., a melted metal or combination of melted metals) is deposited or otherwise presented between adjacent component parts and operative to form a fixed and substantially fluid-tight connection therebetween. Examples of processes that can be used to form such a flowed-material joint include, without limitation, welding processes, brazing processes and soldering processes. In such cases, one or more metal materials and/or alloys can be used to form such a flowed-material joint, in addition to any material from the component parts themselves. Another example of a process that can be used to form a flowed-material joint includes applying, depositing or otherwise presenting an adhesive between adjacent component parts that is operative to form a fixed and substantially fluid-tight connection therebetween. In such case, it will be appreciated that any suitable adhesive material or combination of materials can be used, such as one-part and/or two-part epoxies, for example.

Further still, terms such as "gas," "pneumatic" and "fluid" as well as variants thereof, are used herein to broadly refer to and include any gaseous or vaporous fluid. Most commonly, air is used as the working medium of gas spring devices, such as those described herein, as well as suspension systems and other components thereof. However, it will be understood that any suitable gaseous fluid could alternately be used.

It will be recognized that numerous different features and/or components are presented in the embodiments shown and described herein, and that no one embodiment is specifically shown and described as including all such features and components. However, it is to be understood that the subject matter of the present disclosure is intended to encompass any and all combinations of the different features and components that are shown and described herein, and, without limitation, that any suitable arrangement of features and components, in any combination, can be used. Thus it is to be distinctly understood claims directed to any such combination of features and/or components, whether or not specifically embodied herein and whether or not initially presented in herein, are intended to find support in the present disclosure.

Thus, while the subject matter of the present disclosure has been described with reference to the foregoing embodiments and considerable emphasis has been placed herein on the structures and structural interrelationships between the component parts of the embodiments disclosed, it will be appreciated that other embodiments can be made and that many changes can be made in the embodiments illustrated and described without departing from the principles hereof. Obviously, modifications and alterations will occur to others upon reading and understanding the preceding detailed description. Accordingly, it is to be distinctly understood that the foregoing descriptive matter is to be interpreted merely as illustrative of the subject matter of the present disclosure and not as a limitation. As such, it is intended that the subject matter of the present disclosure be construed as including all such modifications and alterations insofar as they come within the scope of the appended claims and any equivalents thereof.

The invention claimed is:

1. A gas spring and gas damper assembly comprising:
a flexible spring member having a longitudinal axis and including a flexible wall extending peripherally about said axis and longitudinally between opposing first and second ends to at least partially define a spring chamber;
a first end member extending across said first end of said flexible spring member and secured to said flexible spring member such that a substantially fluid-tight seal is formed therebetween;
a second end member extending across said second end of said flexible spring member and secured to said flexible spring member such that a substantially fluid-tight seal is formed therebetween, said second end member including an end member wall that at least partially defines an end member chamber having a fixed volume;
a partition wall extending across said end member chamber and secured along said end member wall such that said end member chamber is separated into first and second damping chambers having corresponding first and second fixed volumes;
a damper rod extending longitudinally between opposing first and second ends with said first end operatively connected to said first end member and said second end disposed within said end member chamber of said second end member, said damper rod including a gas transfer passage extending longitudinally therealong, said gas transfer passage disposed in fluid communication between said spring chamber and said end member chamber;
a first damper piston disposed within said first damping chamber; and,
a second damper piston disposed within said second damping chamber;
said first and second damper pistons being secured to said damper rod such that said first and second damper pistons move relative to said second end member and said partition wall upon displacement of said first and second end members relative to one another.

2. A gas spring and gas damper assembly according to claim 1, wherein said first damping chamber is substantially fluidically isolated from said spring chamber by one of a portion of said end member wall and a cover wall extending across an open end of said end member wall.

3. A gas spring and gas damper assembly according to claim 2, wherein said cover wall includes a passage extending therethrough such that said first damping chamber and said spring chamber can fluidically communicate through at least said passage.

4. A gas spring and gas damper assembly according to claim 1, wherein said damper rod includes a plurality of orifices formed therealong in fluid communication with said gas transfer passage placing at least one of said first chamber portion of said first damping chamber, said second chamber portion of said first damping chamber, said first chamber portion of said second damping chamber and said second chamber portion of said second damping chamber in fluid communication with said spring chamber.

5. A gas spring and gas damper assembly according to claim 1, wherein a valve assembly is connected through said partition wall and is selectively operable to permit fluid communication between said first damping chamber and said second damping chamber through said valve assembly.

6. A gas spring and gas damper assembly according to claim 1, wherein a valve assembly is connected through said first damper piston and is selectively operable to permit fluid communication between said first chamber portion and said second chamber portion of said first damping chamber through said valve assembly.

7. A gas spring and gas damper assembly according to claim 1, wherein a valve assembly is connected through said second damper piston and is selectively operable to permit fluid communication between said first chamber portion and said second chamber portion of said second damping chamber through said valve assembly.

8. A gas spring and gas damper assembly comprising:
a flexible spring member having a longitudinal axis and including a flexible wall extending peripherally about said axis and longitudinally between opposing first and second ends to at least partially define a spring chamber;
a first end member extending across said first end of said flexible spring member and secured to said flexible spring member such that a substantially fluid-tight seal is formed therebetween;
a second end member extending across said second end of said flexible spring member and secured to said flexible spring member such that a substantially fluid-tight seal is formed therebetween, said second end member including an end member wall that at least partially defines an end member chamber having a fixed volume;
a damper rod extending longitudinally between opposing first and second ends with said first end operatively connected to said first end member and said second end disposed within said end member chamber of said second end member;
a partition wall extending across said end member chamber and secured along said end member wall such that said end member chamber is separated into first and second damping chambers having corresponding first and second fixed volumes with said first damping chamber substantially fluidically isolated from said spring chamber by one of a portion of said end member wall and a cover wall extending across an open end of said end member wall;
a first damper piston disposed within said first damping chamber;
a second damper piston disposed within said second damping chamber with said first and second damper pistons being secured to said damper rod such that said first and second damper pistons move relative to said second end member and said partition wall upon displacement of said first and second end members relative to one another; and,
a valve assembly connected through said one of a portion of said end member wall and said cover wall and selectively operable to permit fluid communication between said spring chamber and said first damping chamber through said valve assembly.

9. A gas spring and gas damper assembly according to claim 8, wherein said first and second damper chambers are fluidically disposed in series with one another relative to said spring chamber.

10. A gas spring and gas damper assembly according to claim 8, wherein said partition wall includes a passage extending therethrough such that said first and second damping chambers can fluidically communicate through at least said passage.

11. A gas spring and gas damper assembly according to claim 8, wherein said first damper piston separates said first damping chamber into first and second chamber portions disposed along opposing sides of said first damper piston, and said first damper piston includes a passage extending therethrough such that said first and second chamber portions can fluidically communicate through at least said passage.

12. A gas spring and gas damper assembly according to claim 8, wherein said second damper piston separates said second damping chamber into first and second chamber portions disposed along opposing sides of said second damper piston, and said second damper piston includes a passage extending therethrough such that said first and second chamber portions can fluidically communicate through at least said passage.

13. A gas spring and gas damper assembly according to claim 8, wherein a valve assembly is connected through said partition wall and is selectively operable to permit fluid communication between said first damping chamber and said second damping chamber through said valve assembly.

14. A gas spring and gas damper assembly according to claim 8, wherein a valve assembly is connected through said first damper piston and is selectively operable to permit fluid communication between said first chamber portion and said second chamber portion of said first damping chamber through said valve assembly.

15. A gas spring and gas damper assembly according to claim 8, wherein a valve assembly is connected through said second damper piston and is selectively operable to permit fluid communication between said first chamber portion and said second chamber portion of said second damping chamber through said valve assembly.

16. A suspension system comprising:
a pressurized gas system; and,
at least one gas spring and gas damper assembly according to claim 8 in fluid communication with said pressurized gas system.

17. A suspension system comprising:
a control system operative to selectively actuate one or more valve assemblies; and,
at least one gas spring and gas damper assembly according to claim 8 with said valve assembly communicatively coupled with said control system for selective actuation thereof.

18. A suspension system according to claim 17, wherein said control system is communicatively coupled with one or more of a height sensor and a pressure sensor, and said control system operative to selectively actuate one or more of said valve assemblies in relation to one of a height and a pressure associated with said gas spring and gas damper assembly.

19. A suspension system comprising:
a pressurized gas system;
a gas spring and gas damper including:
a flexible spring member having an longitudinal axis and including a flexible wall extending peripherally about said axis and longitudinally between opposing first and second ends to at least partially define a spring chamber in fluid communication with said pressurized gas system;
a first end member extending across said first end of said flexible spring member and secured to said flexible spring member such that a substantially fluid-tight seal is formed therebetween;

a second end member extending across said second end of said flexible spring member and secured to said flexible spring member such that a substantially fluid-tight seal is formed therebetween, said second end member including an end member wall that at least partially defines an end member chamber having a fixed volume;

a partition wall extending across said end member chamber and secured along said end member wall such that said end member chamber is separated into first and second damping chambers having corresponding first and second fixed volumes with said first damping chamber substantially fluidically isolated from said spring chamber by one of a portion of said end member wall and a cover wall extending across an open end of said end member wall;

a damper rod extending longitudinally between opposing first and second ends with said first end operatively connected to said first end member and said second end disposed within said end member chamber of said second end member, said damper rod including a gas transfer passage extending longitudinally therealong, said gas transfer passage disposed in fluid communication between said spring chamber and said end member chamber;

a first damper piston disposed within said first damping chamber;

a second damper piston disposed within said second damping chamber with said first and second damper pistons being secured to said damper rod such that said first and second damper pistons move relative to said second end member and said partition wall upon displacement of said first and second end members relative to one another; and, a valve assembly connected through said one of a portion of said end member wall and said cover wall and selectively operable to permit fluid communication between said spring chamber and said first damping chamber through said valve assembly; and, a control system operative to selectively actuate said valve assembly.

20. A suspension system according claim 19, wherein said valve assembly is one of:

connected through said partition wall and selectively operable to permit fluid communication between said first and second damping chambers;

connected through said first damper piston and selectively operable to permit fluid communication between said first and second chamber portions; and, connected through said second damper piston and selectively operable to permit fluid communication between said first and second chamber portions.

* * * * *